United States Patent [19]
Crunkelton

[11] Patent Number: 6,098,389
[45] Date of Patent: Aug. 8, 2000

[54] PICKING FINGER ASSEMBLY FOR FRUIT HARVESTING

[76] Inventor: William S. Crunkelton, 306 N. Ruth Rd., Avon Park, Fla. 33825

[21] Appl. No.: 09/407,500

[22] Filed: Sep. 28, 1999

Related U.S. Application Data

[63] Continuation-in-part of application No. 08/941,608, Sep. 30, 1997, Pat. No. 5,966,915.

[51] Int. Cl.[7] .................................................. A01D 46/24
[52] U.S. Cl. ............................. 56/328.1; 56/330; 56/332
[58] Field of Search .................................. 56/328.1, 330, 56/329, 331, 340.1, 332

[56] References Cited

U.S. PATENT DOCUMENTS

| | | | |
|---|---|---|---|
| 3,827,221 | 8/1974 | Chen | 56/328.1 |
| 5,161,358 | 11/1992 | Crunkelton | 56/330 X |
| 5,428,947 | 7/1995 | Visser | 56/330 X |
| 5,666,795 | 9/1997 | Wilkinson | 56/330 X |
| 5,966,915 | 10/1999 | Crunkelton | 56/330 X |

*Primary Examiner*—H. Shackelford

[57] ABSTRACT

A picking finger assembly is insertable into and withdrawable from a canopy of a fruit tree during a mechanical harvesting. The picking finger assembly provides for, during the withdrawal, a gathering of fruit growing upon the fruit tree where a picking pressure may be applied during to sever the fruit from the tree. A finger extending from an arm producing this gathering and application of the picking pressure to the fruit. The finger is displaceable relative to the arm in response to engagement of an obstruction, such as a large branch. This displacement provides for an initial relatively strong resistance to displacement, then a significantly lesser resistance. In one embodiment a transfer shaft moves within a transfer channel to provide for this dual resistance pressure feature. An angular change in the transfer channel provides for immediate transfer of transfer shaft within transfer channel once such transfer commences. A guide path on the finger acts to ensure proper positioning of stems and branches relative to the finger during the withdrawal. A cutting edge adjacent the guide path provides for assistance in severing the stem of the fruit being harvested.

20 Claims, 6 Drawing Sheets

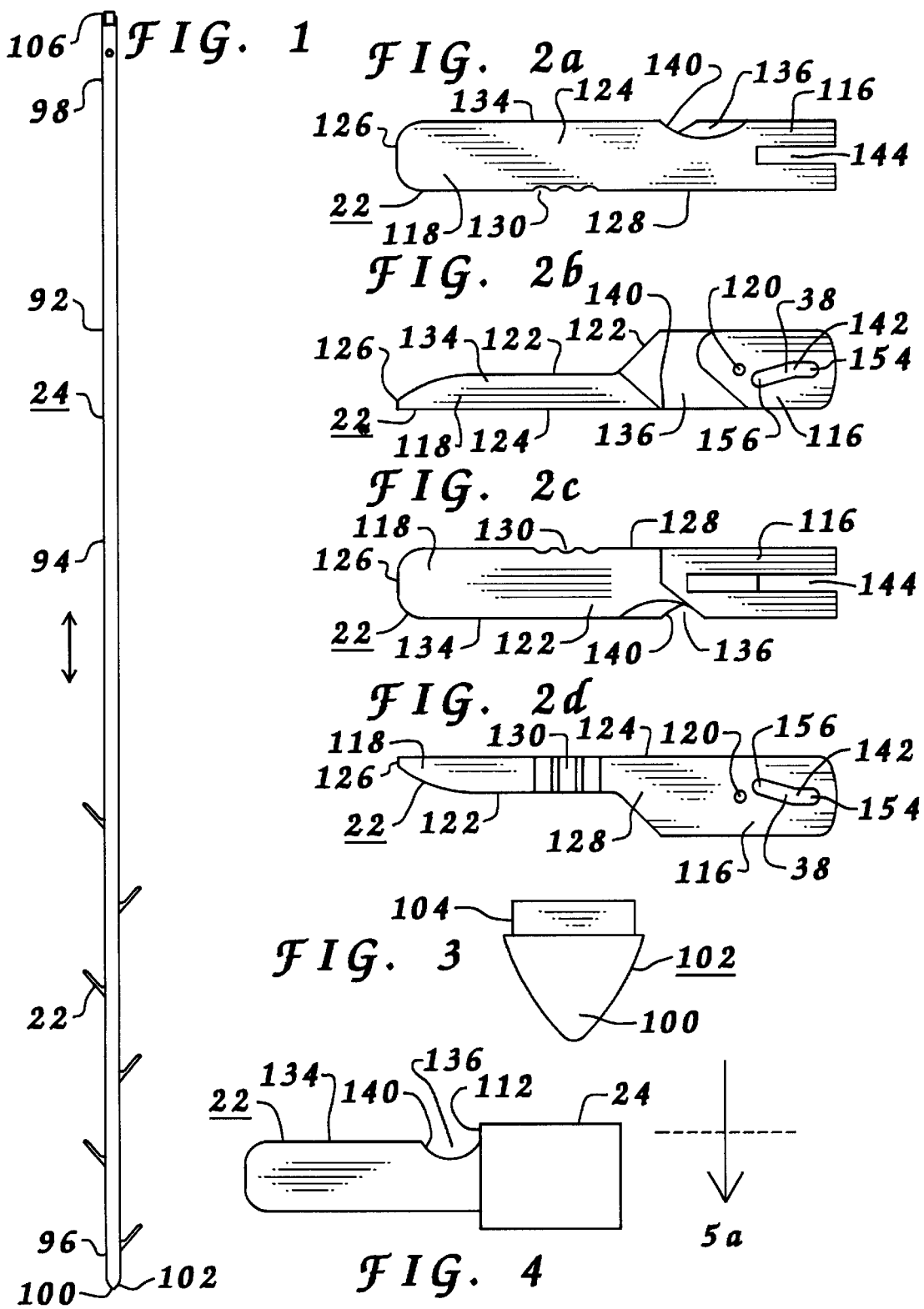

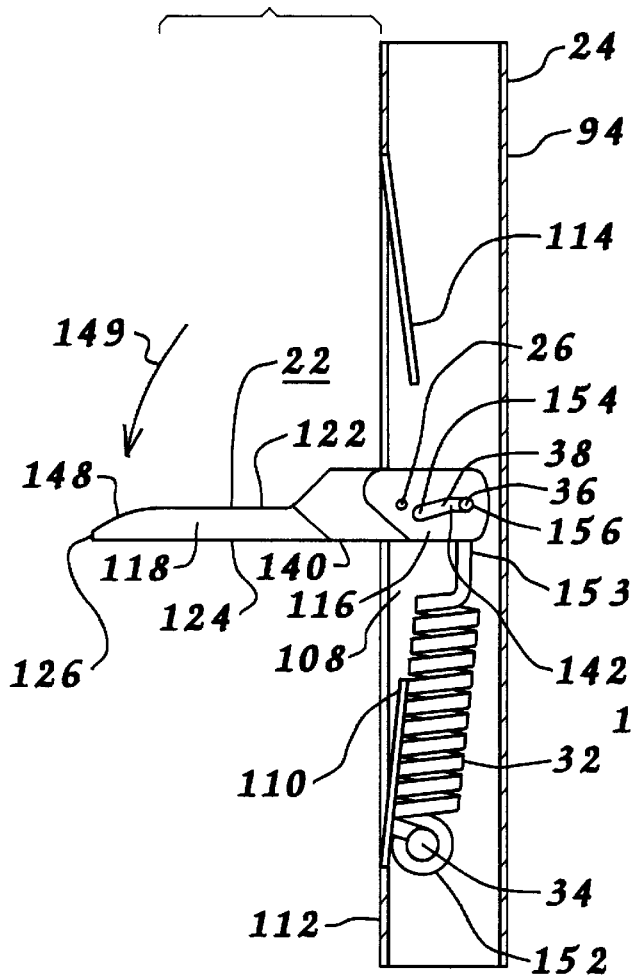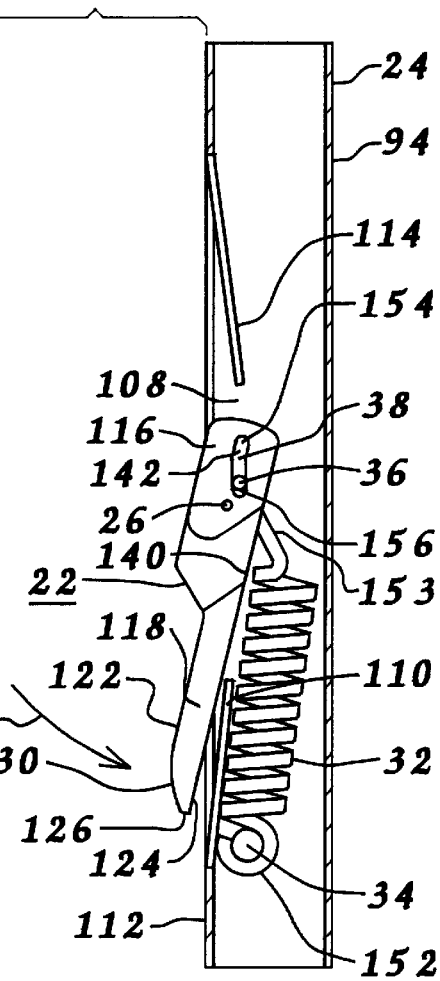

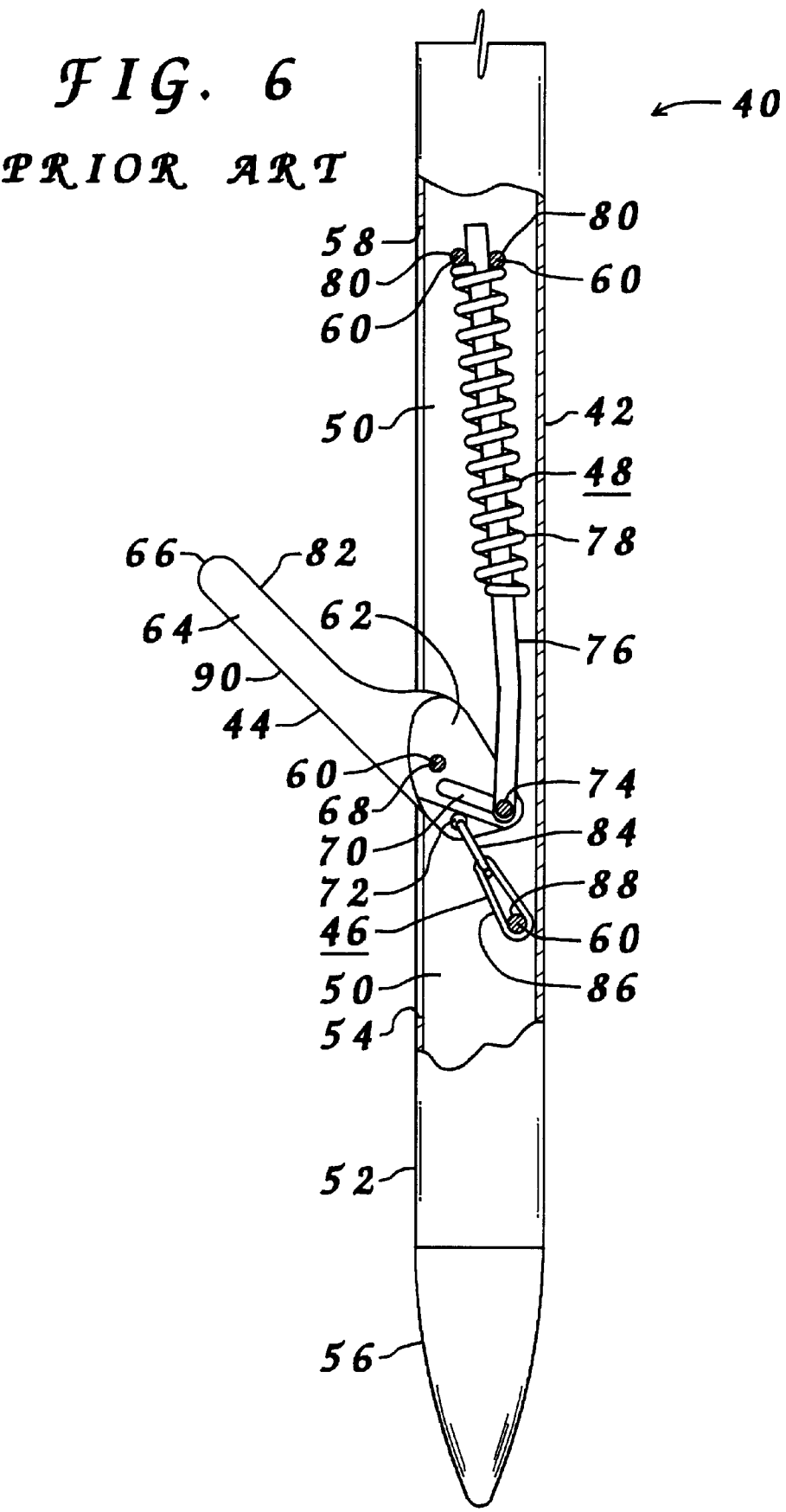

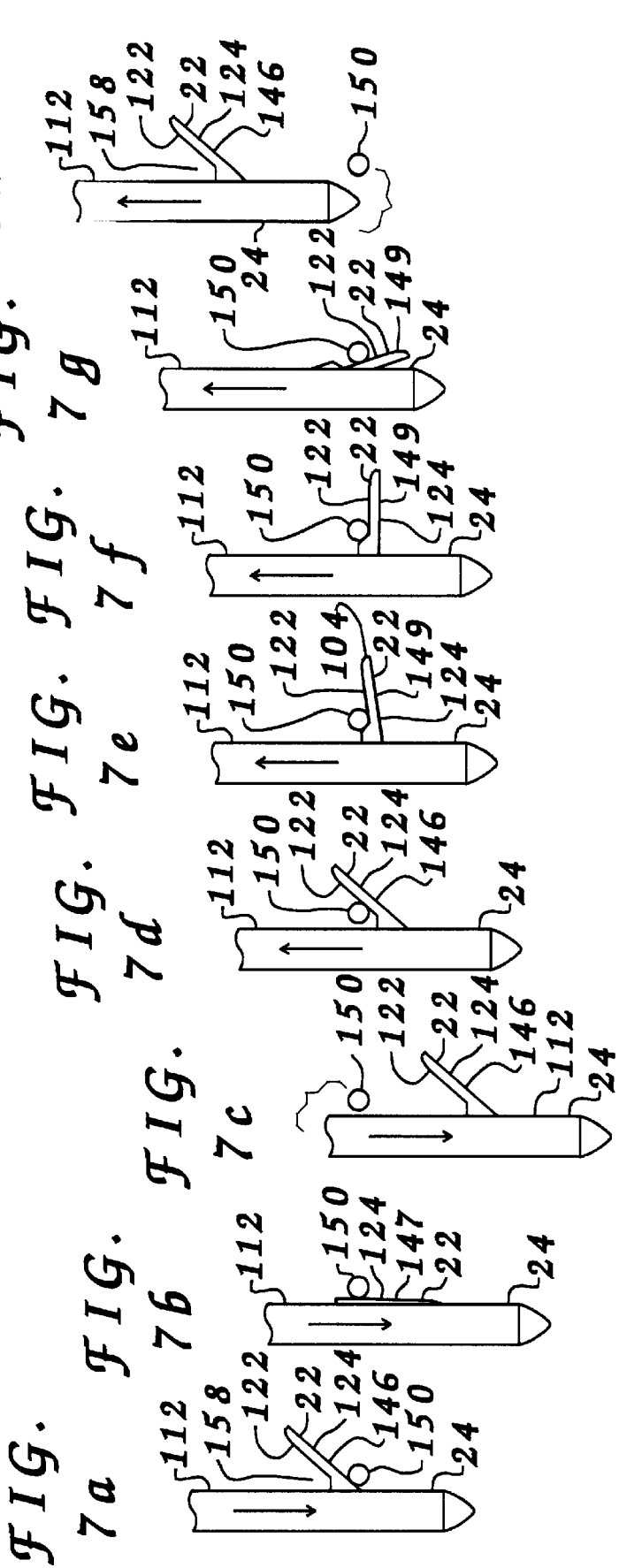

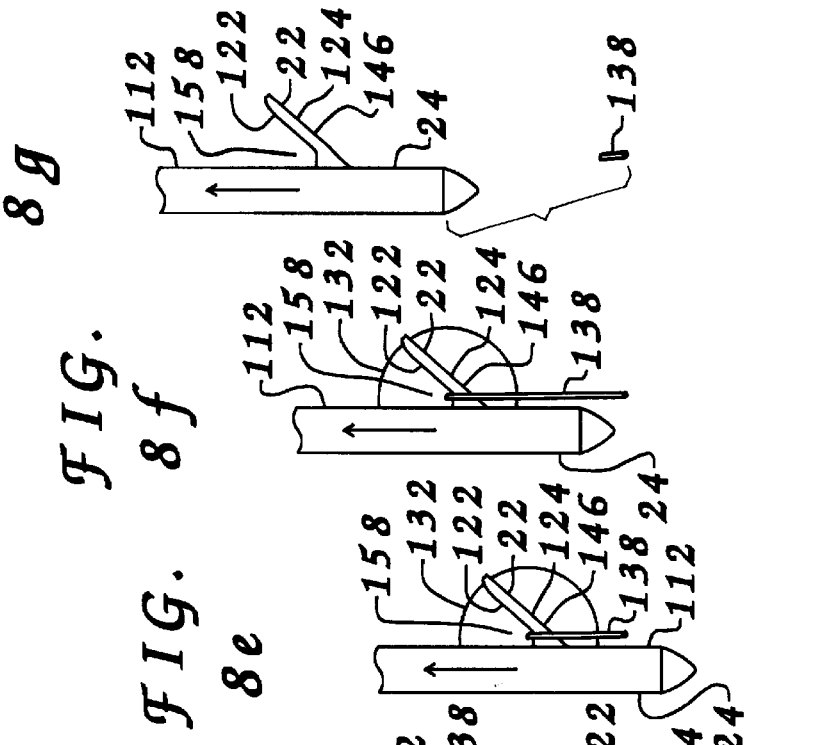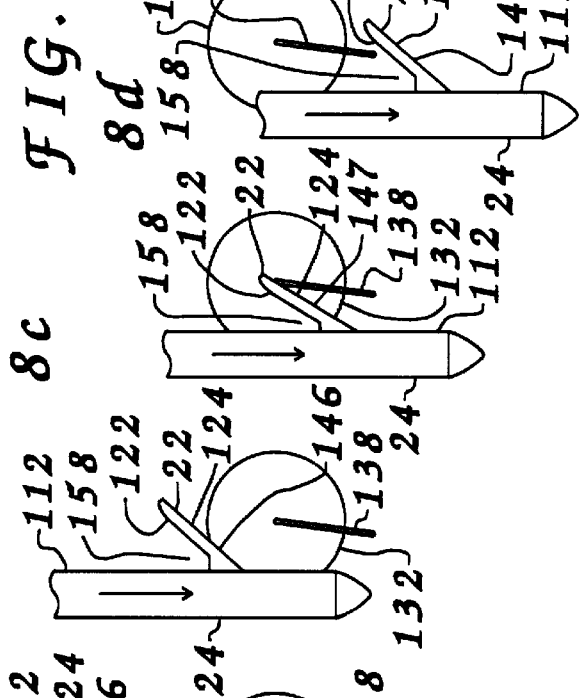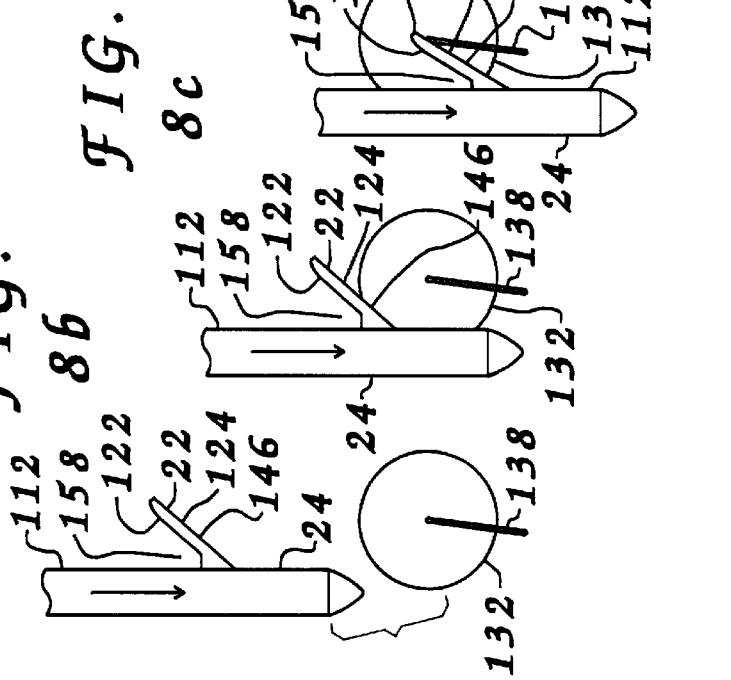

PICKING FINGER ASSEMBLY FOR FRUIT HARVESTING

CROSS-REFERENCE

This application is a continuation-in-part of Ser. No.: 08/941,608 filed Sep. 30, 1997 now U.S. Pat. No. 5,966,915, entitled "Fruit Harvesting Machine". This application is incorporated herein by this reference.

BACKGROUND

1. Field of the Invention

Generally, the invention relates to mechanical picking finger assemblies. More specifically, the invention relates to such assemblies which are selectively displaceable in response to external pressures as utilized for harvesting of fruit from trees.

2. Description of the Prior Art

Numerous methods exist to harvest the various fruits currently being cultivated. A first group of such methods employ various mechanical devices which provide for a completely mechanical severing of the individual fruit from a tree. A second group of such methods employ various mechanical devices which provide assistance to individual human pickers during a picking procedure to sever the fruit from the tree. This group generally is limited to mechanical devices which may be held by the human picker during the picking procedure. A third method, specific to the type of fruit being harvested, involves the physical picking of the fruit from the tree by individual human pickers without utilization of any mechanical device.

Referring now specifically to citrus fruits, currently the vast majority of such fruit is harvested by being hand picked by people. This harvesting technique has changed little over the years. Pickers grasp individual citrus fruit members and exert a twisting action, a pulling action or a combination of a twisting and pulling action thereon to separate the fruit from the tree. Then, the picker places the severed fruit in a collection bag. This process is repeated until the collection bag has a desired quantity of picked fruit therein. At this point the contents of the collection bag are deposited into a secondary collection container of sufficient dimensions to contain a larger quantity of the picked fruit than that contained by the collection bag. While certain fruit on a tree is accessible while the picker stands on the ground, certain fruit on the tree may only be accessed by elevating the picker above ground level. The most common method of providing such elevation of the picker is by placing a ladder against the tree while the picker ascends the ladder. It is common practice in the industry to apply various chemicals to the tree and/or surrounding ground at various times prior to harvesting the crop. Therefore, chemicals may remain on the tree during the harvesting operation. As can be readily seen, the current method of manual harvesting of citrus fruit is time consuming and exposes the picker to dangerous conditions, including those during the period of time while the picker is elevated above ground level as well as possible exposure to chemicals.

Certain types of fruit are more adapted to such mechanical harvesting than other types of fruit. Reference is now made to machines which harvest fruit under the above identified method where there exists a completely mechanical severing of the fruit from the tree. The art is rich with such machines designed to harvest fruit by severing the fruit from fruit trees. Such machines generally employ one of two severing methods. The first method involves producing a 'shaking action' within the canopy of the tree. This 'shaking action' may involve grasping a portion of the tree and generating the desired 'shaking action' on the entire tree or may involve insertion of one or more members into the canopy wherein the member or members produce the desired 'shaking action' to the canopy without statically engaging, or otherwise grasping, a portion of the tree. The second method involves engaging individual fruit members, or engaging individual connecting stems, and producing a severing action between the individual fruit and the tree.

Without regard to the severing method employed, there exist three strong desires which need to be fulfilled in order for the specific harvesting machine to be commercially accepted within the industry. The first desire is to avoid unnecessary damage to the tree during the harvesting of the fruit attached thereon. This desire relates to actual damage to the tree as well as incidental damage as exampled by removal of immature, or second crop, fruit from certain fruit trees which begin to produce the second crop prior to harvesting of a first mature crop. The second desire is to harvest an extremely high percentage of the mature fruit from each of the trees. The third desire is that the harvesting performed, which satisfies the above two desires, must be economically competitive compared to existing harvesting techniques.

Various deficiencies exist with machines which rely upon the severing action principle. Generally, these machines are referred to as canopy penetration machines which utilize rods with picking members, sometimes referred to as hooks, extending therefrom. Due primarily to the picking members utilized by these machines, these machines also universally have a tendency to damage the tree during harvesting. Additionally, these machines tend to leave an unacceptable quantity of fruit on the tree.

In the prior art we find numerous attempts to provide for a mechanical harvesting of fruit from trees. Several of these attempts have relied upon a 'penetrate and engage' method whereby a probe or arm is inserted into the canopy of the tree where members extending from the probe or arm engage the fruit in close proximity to the stem. Such engagement, following continued movement of the probe or arm, provides for generating a picking pressure between the individual fruit and the tree. Such pressure being preferably produced at, or in close proximity to, a terminal end of the stem where the fruit actually attaches to the tree. While much effort has been expended attempting to create a machine based upon the 'penetrate and engage' method, very little effort has been extended on creating an efficient and productive picking finger assembly which may operate with such machines. Your applicant has spent considerable time and effort in creating, developing and reducing to actual practice both a practical picking finger assembly and a practical harvesting machine which makes use of such picking finger assemblies.

Applicant's prior U.S. Pat. No. 5,161,358, is the best example of a functional picking finger assembly. While functional, this reference relies upon a complicated design having many working parts. This early design required two (2) separate and distinct tension member assemblies which individually controlled distinct directional finger displacements. Both of these tension member assemblies were complicated.

Various attempts have been made to provide a canopy penetration machine capable of harvesting extremely high percentages of fruit from a tree while minimizing damage to the tree. These attempts have been less efficient than desired primarily due to the construction of the picking member (picking finger assembly) employed thereon. As such, it may be appreciated that there continues to be a need for a canopy penetration mechanical harvesting machine which will harvest a high percentage of the fruit from the tree while inflicting minimal damage to the tree. The present invention provides for canopy penetration machines which substantially fulfill these needs.

SUMMARY

In view of the foregoing disadvantages inherent in the known types of picking finger assemblies, your applicant has devised a picking finger assembly, and associated method of providing control over the picking finger assembly, which may be utilized for a mechanical harvesting of fruit from a canopy of a fruit tree. The picking finger assembly includes an arm, a finger, pivotal coupling means, an anchor member and a tension member. The arm is displaceable relative to the canopy of the fruit tree during a deployment cycle having an insertion period and a withdrawal period. The mechanical harvesting of the fruit from the fruit trees occurring during at least a portion of the withdrawal period of the deployment cycle. The arm having a side generally vertically disposed during the mechanical harvesting. The finger has a base portion and an extension portion with the extension portion extending from the base portion and having a withdrawal contact surface. The pivotal coupling means provides for a mounting of the finger relative to the arm using the base portion of the finger. Following the mounting the finger has a pivotal movement within a range of motion relative to the arm. The extension portion of the finger extending outward relative to the side of the arm following the mounting. The anchor member is positioned relative to the arm. The tension member has a first end and a second end. The first end of the tension member is slidably attached relative to the finger for displacement relative to the finger between a first placement location and a second placement location during at least a portion of the pivotal movement of the finger relative to the arm. The second end of the tension member is attached relative to the anchor member and therefore relative to the arm. The tension member applies a controlling pressure to the finger while the finger is in at least a select positional orientation within the range of motion of the finger during the pivotal movement of the finger relative to the arm. This provides for the tension member to provide for a positioning of the finger relative to the arm where the finger is positioned in a static position with the withdrawal contact surface of the extension portion of the finger remaining at an acute angle relative to the side of the arm in the absence of an external pressure applied to the extension portion of the finger. The tension member providing for a first range of resistance to displacement of the finger from the static position when a withdrawal contact pressure is applied to the withdrawal contact surface of the finger while the first end of the tension member remains at the first placement location relative to the finger. The first end of the tension member moves from the first placement location to the second placement location following a predetermined amount of an angular displacement of the extension portion of the finger relative to the arm in response to a predetermined amount of the withdrawal contact pressure applied to the withdrawal contact surface of the extension portion of the finger. The tension member then provides for a second range of resistance to further displacement of the finger following the movement of the first end of the tension member to the second placement location. The second range of resistance is significantly less than the first range of resistance.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a picking finger assembly which may be utilized for mechanical harvesting of fruit.

Other objects include;

a) to provide for a picking finger assembly where an extension portion of the finger typically remains in a static position relative to the arm.

b) to provide for a controlled displacement of the extension portion of the finger during insertion of the picking finger assembly into a canopy of a fruit tree in response to resistance pressure so as to ensure easy penetration of the canopy without damage to the fruit tree.

c) to provide for a controlled displacement of the extension portion of the finger during withdrawal of the picking finger assembly from the canopy of the fruit tree in response to resistance pressure so as to prevent damage to the fruit tree.

d) to provide for a first, relatively high, level of resistance during the controlled displacement of the extension portion of the finger during withdrawal of the picking finger assembly from the canopy of the fruit tree in response to resistance pressure applied to the extension portion of the finger to prevent premature release of any fruit engaged by the picking finger assembly.

e) to provide for a second, relatively low, level of resistance during the controlled displacement of the extension portion of the finger during withdrawal of the picking finger assembly from the canopy of the fruit tree in response to resistance pressure applied to the extension portion of the finger following a predetermined amount of the controlled displacement of the extension portion of the finger at the first, relatively high, level of resistance where the engaged object, or objects, is quickly released with minimal sliding contact where further contact might tend to damage the object or objects.

f) to provide for a single tension member to provide for: 1) maintaining the finger in the static position, 2) providing the resistance to displacement during insertion of the picking finger assembly into the canopy of the fruit tree, 3) providing the first, relatively high, level of resistance to displacement during the withdrawal of the picking finger assembly from the canopy of the fruit tree, and 4) providing the second, relatively low, level of resistance to displacement during the withdrawal of the picking finger assembly from the canopy of the fruit tree.

g) to provide for transfer of one end of a tension member from a first relative spacing from a pivotal axis of the finger to a second relative spacing from the pivotal axis of the finger to provide for the lessening of resistance to further pivotal displacement of the finger in response to resistance during withdrawal of the picking finger assembly from the canopy of the fruit tree.

h) to provide for the above transfer of one end of the tension member to occur as a result of movement of a transfer shaft within a transfer channel positioned within the finger.

i) to provide for an angular change in the transfer path from the above first relative spacing to the second relative spacing to provide for rapid exchange from the first, relatively high, level of resistance to the second, relatively low, level of resistance.

j) to provide for a picking finger assembly having a minimal number of components while providing the desired functional features.

k) to provide for guide channel in an upper extent of the extension portion of the finger to guide portions of the canopy of the fruit tree into proper positioning relative to the picking finger assembly.

l) to provide for a cutting edge adjacent the above guide channel to assist in severing stems of the fruit of the fruit tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 is a top plan view of an arm.

FIG. 2a is a front elevational view of a finger.

FIG. 2b is a top plan view of the finger shown in FIG. 2a.

FIG. 2c is a rear elevational view of the finger shown in FIG. 2a.

FIG. 2d is a bottom plan view of the finger shown in FIG. 2a.

FIG. 3 is a top plan view of an arm tip.

FIG. 4 is a front elevational view of an arm having one (1) finger installed therein.

FIG. 5c is a sectional view of the assembly shown in FIG. 5a with the finger partially displaced in a withdrawal yielding direction.

FIG. 5d is a sectional view of the assembly shown in FIG. 5a with the finger fully displaced in the withdrawal yielding direction.

FIG. 6 is a top plan view of one of applicant's earlier assemblies and identified as 'prior art'.

FIG. 7a through FIG. 7h are top plan views of an arm and a finger in various operational orientations.

FIG. 8a through FIG. 8g are top plan views of the arm and finger depicted in FIG. 7a in various operational orientations.

DESCRIPTION

Figure 5A:
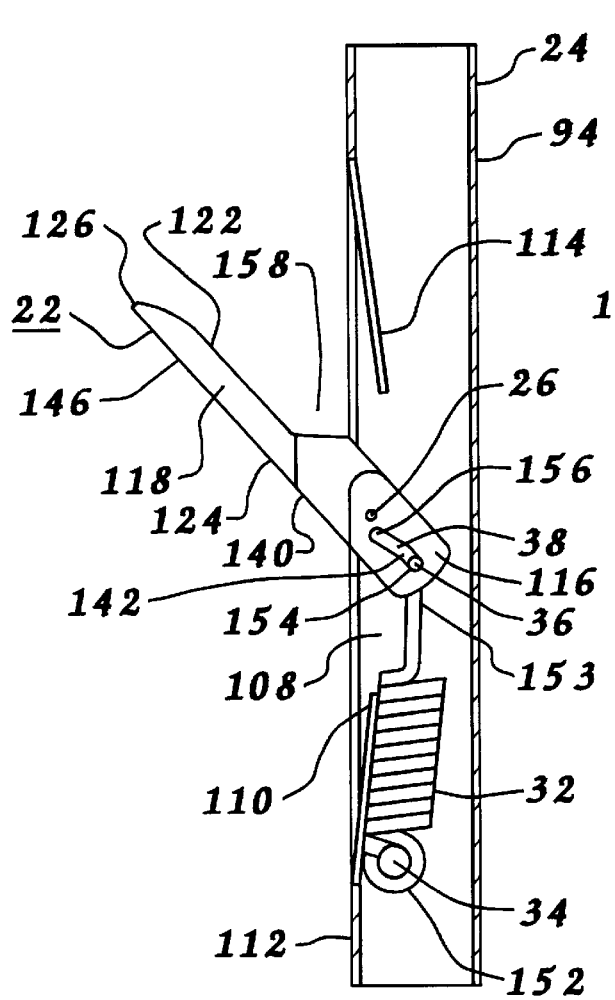
FIG. 5a is a sectional view as taken from the section line '5a' shown in FIG. 4.

Reference is hereafter made to the drawings where like reference numerals refer to like parts throughout the various views.

Overview of Preferred Embodiment of Picking Finger Assembly

In the most preferred embodiment a picking finger assembly 20, see FIG. 5a through FIG. 5d, has a finger 22 pivotally positioned relative to an arm 24. In practice at least several fingers 22, with associated control components, most likely will be positioned relative to each arm 24. In the most preferred embodiment a pivot shaft 26 penetrates arm 24 and penetrates finger 22 to provide for the desired pivot of finger 22 relative to arm 24. Finger 22 may thus move within a range of motion between an insertion yielding direction limit 28, see FIG. 5b, and a withdrawal yielding direction limit 30, see FIG. 5d. A tension member 32 provides control over, and varying resistance to displacement of, finger 22 relative to arm 24 within this range of motion. In this most preferred embodiment tension member 32 is restricted relative to arm 24 using an anchor member 34. Tension member 32 is also attached to finger 22 using a transfer shaft 36 which is positioned within a transfer channel 38 of finger 22. Finger 22 therefore, as more fully disclosed below, has differing levels of resistance to pivotal displacement relative to arm 24 depending upon a pressure applied by tension member 32 to transfer shaft 36 and an orientation of transfer shaft 36 relative to pivot shaft 26. In the most preferred embodiment picking finger assembly 20 has six (6) components being arm 24, finger 22, pivot shaft 26, transfer shaft 36, tension member 32 and anchor member 34.

Prior Art Finger Assembly

FIG. 6 depicts, as 'prior art', applicant's earlier picking finger assembly 40 as disclosed in U.S. Pat. No. 5,161,358. Picking finger assembly 40 comprised an arm 42, a finger 44, an insertion yield tension member assembly 46 and a withdrawal yield tension member assembly 48. The prior art teaches the positioning of several fingers 44 relative to each arm 42.

Arm 42 required an opening 50 through a side 52 and which extended from an outer extent 54, positioned toward a tip 56, to an inner extent 58. Arm 42 additionally required four (4) anchor points 60 (in the form of opposing aligned sets of apertures) for mounting of structures thereto utilizing bolts and nuts, not shown.

Finger 44 was a molded piece and comprised a base portion 62 and an extension portion 64. Extension portion 64 was generally uniformly dimensioned along a majority of the length with a rounded end 66 distal from base portion 62. Base portion 62 had a pivotal axis 68, in the form of an aperture therethrough, a slot 70 and an insertion yield tension anchor aperture 72. It being noted that slot 70 was linearly aligned along its length. Finger 44 pivoted about pivotal axis 68 (at a bolt secured by a nut through one set of apertures in arm 42) relative to arm 42 in response to various external pressures applied to extension portion 64. Slot 70 allowed for a transfer of a portion of withdrawal yield tension member assembly 48 during specific displacement of finger 44.

Withdrawal yield tension member assembly 48 further comprised a pin 74 positioned within slot 70, a yoke 76 attached to pin 74, a compression spring 78 biasing yoke 76 and two (2) pins 80 (bolts respectively secured by nuts through the apertures in arm 42) securing compression spring 78 relative to arm 42. Withdrawal yield tension member assembly 48 provided for resistance to select displacement of finger 44 when an external pressure is applied to a withdrawal contact surface 82 of extension portion 64 of finger 44.

Insertion yield tension member assembly 46 further comprised a wire swivel clip 84 attached to insertion yield tension anchor aperture 72 of finger 44, a repositioning band 86 (elastic) secured to wire swivel clip 84 and a pin 88 (bolt secured by a nut through one set of apertures in arm 42) securing repositioning band 86 relative to arm 42. Insertion yield tension member assembly 46 provided for resistance to select displacement of finger 44 when an external pressure is applied to an insertion contact surface 90 of extension portion 64 of finger 44.

Prior art picking finger assembly 40 therefore required fifteen (15) components being arm 42, finger 44, pivotal axis 68 (a bolt and a securing nut), wire swivel clip 84, repositioning band 86, pin 88 (a bolt and a securing nut), pin 74, yoke 76, compression spring 78 and two (2) pins 80 (two (2) bolts and respective securing nuts).

As can readily be seen, prior art finger assemblies required extremely complicated structural arrangements in order to operate. While the picking action afforded by applicant's prior invention examples the best arrangement previously available, significantly better performance is obtainable by devices based upon the present invention.

Specifics of Preferred Embodiment of Picking Finger Assembly Arm

It is a requirement of the present invention that an arm be provided for penetration of the canopy of the fruit tree during the mechanical harvesting of fruit therefrom. Many cross sectional shapes are possible with a preferred configuration of rectangular depicted in FIG. 1, FIG. 5a through FIG. 5d and FIG. 7a through FIG. 8g.

It is preferred, but not required, that these arms be linear, or straight. It is a strong desire that the design of the individual arms allow for penetration of the canopy with minimal resistance to such penetration. It is also a requirement that fingers, described elsewhere herein, be mounted to extend from the arm. It is a requirement that each finger be displaceable in at least a first direction relative to the arm. Therefore, it is preferred that components which allow the desired displacement be housed, at least partially, within the confines of the arm. While recesses may be installed in a solid arm to house these components, preferably, the arm will be of a hollow design to allow for easy installation therein of the components. Alternatively, the assembly having the extending finger may be mounted relative to the arm as exampled by above or below the arm. It is possible to provide for a separate housing to contain the various components which in turn may be mounted within or relative to the arm. This provides for ready replacement of damaged or worn components.

Arm 24, see FIG. 1, has a longitudinal length 92 of sufficient length to permit adequate penetration of a tree, not shown. Arm 24 may be formed of various materials and may have any desired cross sectional shape. Arm 24 is depicted as formed of a tube 94 having a series of fingers 22 extending therefrom. Arm 24 has a distal end 96 and a coupling end 98. During normal operation, coupling end 98 is attached to structures, not shown, to retain arm 24 during an insertion action, see FIG. 7a through FIG. 7c and FIG. 8a through FIG. 8d, of the mechanical harvesting and during a withdrawal action, see FIG. 7d through FIG. 7h and FIG. 8e through FIG. 8g of the mechanical harvesting.

Arm 24 preferably has a taper 100 at distal end 96 to assist in penetration of the tree during the insertion. FIG. 1 and FIG. 3 depict an arm cap 102 having taper 100 incorporated thereon. Arm cap 102 also has a mounting end 104 suitable for insertion into tube 94 of arm 24. Arm cap 102 may be secured to arm 24 by any of the methods conventionally known in the art. Arm 24 has a roller 106 attached at coupling end 98. Alternatively, arm 24 may have arm cap 102 secured to coupling end 98.

Referring now to FIG. 5a through FIG. 5d, arm 24 has a finger access opening 108 for passage therethrough of finger 22. Bordering finger access opening 108 is a withdrawal yielding direction panel 110 which is a portion of tube 94 which is partially severed along a side 112 of arm 24. Withdrawal yielding direction panel 110 extends into arm 24. This arrangement allows finger 22 to more closely rest against arm 24 while at withdrawal yielding direction limit 30, see FIG. 5d. Also bordering finger access opening 108 is an insertion yielding direction panel 114 which is a portion of tube 94 which is partially severed along side 112 of arm 24. Insertion yielding direction panel 114 extends into arm 24. This arrangement allows finger 22 to more closely rest against arm 24 while at insertion yielding direction limit 28, see FIG. 5b. Withdrawal yielding direction panel 110 and insertion yielding direction panel 114 provide the desired additional clearance to permit a greater range of motion of finger 22 while more fully blocking access to debris to the inside of arm 24.

It is a strong desire that the exterior of arm 24 be free of any protrusions, other than extending fingers 22, which may otherwise engage portions of the fruit tree being harvested. To this end pressure fitting pins, as conventionally known in the art, inserted within opposing apertures within arm 24 are utilized in the most preferred embodiment for securement of other components to arm 24.

Finger

It is a requirement that a finger be provided having features which provide for pivotal mounting of the finger relative to the arm, provide for engagement of portions of the canopy of the fruit tree during withdrawal of the picking finger assembly and, in combination with other structures of the picking finger assembly, provide for two (2) distinct levels of resistance to displacement in response to engagement of a substantial obstruction during the withdrawing action of the mechanical harvesting. These two (2) levels of resistance are provided for by altering a spacing between the anchor point of the tension member on the finger and the pivotal axis of the finger between a greater spacing and a lesser spacing.

It is a requirement, during mechanical harvesting using a picking finger assembly having features of the present invention, that the tree be slidably engaged proximate a select fruit in order to subsequently produce a picking pressure between the select fruit and the tree. At least one finger, and preferably a plurality of fingers, will extend from each arm. Preferable this extension of the finger from the arm will place the outer, or distal, end of the finger a relatively short distance from the arm. It may appear obvious to make such extension of a significantly greater distance than depicted in the various views in order to facilitate gathering of a greater portion of the canopy during the withdrawal action. This greater length arrangement has proven to be less efficient than desired due to a tendency of the released fingers to continue to make contact with subsequent portions of the canopy and fail to return to the static position from the released position.

Various configurations of fingers may be employed. Each finger will have a base portion and an extension portion. The extension portion may have various cross section configurations including round. In the most preferred embodiment the extension portion will have flat surface with slightly rounded intersection edges therebetween and have a tapering toward a distal end from the base portion. Each finger will have an insertion contact surface which may be contacted during the insertion action of the mechanical harvesting and a withdrawal contact surface which may be contacted during the withdrawal action of the mechanical harvesting. It is a requirement that at least a portion of both the insertion contact surface and the withdrawal contact surface of each finger be angularly arranged relative to the side of the respective arm while in a static position. The angular arrangement of the insertion contact surface will provide for insertion of the arm into the canopy of the tree with minimal resistance. The angular arrangement of the withdrawal contact surface will provide for a sliding engagement of branches of the tree during withdrawal of the arm from the canopy while providing for engagement of fruit attached to those branches where that fruit has a diameter equal to, or greater than, a predetermined measurement.

FIG. 2a through FIG. 2d, FIG. 5a through FIG. 5d, FIG. 7a through FIG. 7h and FIG. 8a through FIG. 8g depict finger 22 having the above identified properties. Finger 22 preferably is formed of a single piece by a molding process. Though preferably the single piece construction, finger 22 may generally be defined as having a base portion 116 and an extension portion 118, see FIG. 2a through FIG. 2d and FIG. 5a through FIG. 5d. Finger 22 has a pivot aperture 120 penetrating base portion 116, shown in FIG. 2b and FIG. 2d. Finger 22 has a withdrawal contact surface 122, best shown in FIG. 2c, an insertion contact surface 124, best shown in FIG. 2a and an extension distal end 126. Generally, withdrawal contact surface 122 and insertion contact surface 124 are parallel along a substantial portion of extension portion 118. Preferably, withdrawal contact surface 122 tapers in close proximity to extension distal end 126 to prevent rigid engagement of objects. This is accomplished by providing for a lessening of the spacing between withdrawal contact surface 122 and the adjacent portion of insertion contact surface 124 during an approach to extension distal end 126.

Insertion contact surface 124 provides for contact with portions of the tree during the insertion action of arm 24, see FIG. 7a through FIG. 7c and FIG. 8a through FIG. 8d. Withdrawal contact surface 122 provides for contact with portions of the tree during a withdrawal of arm 24, see FIG. 7d through FIG. 7h and FIG. 8e through FIG. 8g.

Preferably, a lower surface 128, best shown in FIG. 2d, of finger 22 has a series of indentations 130, best shown in FIG. 2a, FIG. 2c and FIG. 2d, thereon to enhance gripping properties between finger 22 and fruit 132, see FIG. 8a through FIG. 8f. Preferably, an upper surface 134, best shown in FIG. 2b, of finger 22 has a guide path 136, best shown in FIG. 2a, FIG. 2b, FIG. 2c and FIG. 4, to further contain a stem 138, see FIG. 8a through FIG. 8g, of the tree. Guide path 136 extends across upper surface 134 from insertion contact surface 124 to withdrawal contact surface 122 and is generally aligned with side 112 of arm 24, see FIG. 4, in the absence of external pressure applied to finger 22. A cutting edge 140, see FIG. 2a through FIG. 2c, FIG. 3 and FIG. 5a through FIG. 5d, is formed by an acute angular intersection of an outer edge of guide path 136 and withdrawal contact surface 122. In certain orientations of stem 138 to cutting edge 140 during withdrawal, cutting edge 140 may provide a cutting pressure to stem 138 during such withdrawal to assist in the severing of fruit 132.

In the most preferred embodiment finger 22 has transfer channel 38, see FIG. 2b, FIG. 2d and FIG. 5a through FIG. 5d, which receives transfer shaft 36, see FIG. 5a through FIG. 5d, therein. As more fully described below tension member 32 is attached to transfer shaft 36 and applies a controlling pressure thereto. Following a predetermined amount of displacement, see FIG. 5c, transfer shaft 36 moves within transfer channel 38 to alter a spacing between transfer shaft 36 and pivot shaft 26 to lessen resistance to further displacement of finger 22. An angular change 142, see FIG. 2b, FIG. 2d and FIG. 5a through FIG. 5d, of the transfer channel is disposed at an obtuse angle to create a directional change. The transfer channel 38 provides for rapid and certain movement of transfer shaft 36 without requiring excessive friction within transfer channel 38. While generally the entire length of transfer channel 38 is utilized in the embodiment depicted, it is possible to utilize less that the entire length if desired.

In order to fully utilize the available width of base portion 116 of finger 22 mounted within arm 24 it is desired to provide for access to anchor tension member 32 to transfer shaft 36 through base portion 116. This arrangement prevents the more complicated arrangement of providing opposing access on the opposing sides of the base portion, as was required by the prior art. An access channel 144, see FIG. 2a and FIG. 2c, which extends to transfer channel 38 provides this access.

Pivotal Coupling Means

It is a requirement that the finger be attached relative to the arm wherein the finger may pivot within a predetermined range of motion. Various methods, as conventionally known in the art, may be employed to provide for this pivotal coupling. In the most preferred embodiment a pivot shaft penetrates opposing apertures in the arm and a pivot aperture in the base portion of the finger to provide for the pivotal coupling. Alternatively, structures may exist on the finger, as exampled by opposing protrusions, which mount relative to structures such as indentations or apertures on the arm. Similarly, structures may exist on the arm, as exampled by opposing protrusions, which mount relative to structures such as indentations or apertures on the finger.

FIG. 2b and FIG. 2d depict finger 22 as having pivot aperture 120 penetrating therethrough. Pivot aperture 120 then receives pivot shaft 26, see FIG. 5a through FIG. 5d, which in turn penetrates opposing apertures, not shown, in arm 24 for secure positioning thereat. Finger 22 may freely pivot about pivot shaft 26 in a predetermined range of motion in the absence of other controlling pressures applied thereto.

Positional Orientations

The finger will normally be positioned in a static position by bias of the tension member. The static position will place the insertion contact surface of the extension portion of the finger, which is facing the outer end of the arm, at an obtuse angle, or greater than ninety degrees, relative to the intersecting side of the arm. This arrangement provides for insertion of the picking finger assembly into the canopy of the fruit tree with minimal resistance. The static position will place the withdrawal contact surface of the extension portion of the finger, which is away from the outer end of the arm, at an acute angle, or less than ninety degrees, relative to the intersecting side of the arm. This arrangement provides for engagement and gathering of portions of the canopy of the fruit tree during withdrawal of the arm from the canopy of the fruit tree. It is a requirement that the finger be capable of moving from the static position in a withdrawal yielding direction in response to pressure applied to the withdrawal contact surface of the extension portion during withdrawal of the picking finger assembly from the canopy of the fruit tree. Movement in the withdrawal yielding direction moves the extension portion of the finger first away from the arm and, if such movement continues beyond perpendicular, on toward the arm. It is a strong desire that the finger be capable of moving from the static position in an insertion yielding direction in response to pressure applied to the insertion contact surface of the extension portion during insertion of the picking finger assembly into the canopy of the fruit tree. Movement in the insertion yielding direction moves the extension portion of the finger toward the arm. Of course, the finger may move in the withdrawal yielding direction during insertion of the picking finger assembly into the canopy of the fruit tree and in the insertion yielding direction during withdrawal of the picking finger assembly from the canopy of the fruit tree in response to specific pressures applied thereon.

Reference is now made specifically to FIG. 5a through FIG. 5d and FIG. 7a through FIG. 7h. Finger 22 is retained in a static position 146, see FIG. 5a, FIG. 7a, FIG. 7c, FIG. 7d and FIG. 7h, in the absence of pressure to withdrawal contact surface 122 or insertion contact surface 124. A relatively lower level of pressure applied to insertion contact surface 124, see FIG. 5b and FIG. 7b, results in movement of finger 22 in an insertion yielding direction 147, see comparison from FIG. 5a to FIG. 5b. A significantly greater level of pressure applied to withdrawal contact surface 122, see FIG. 5c, FIG. 5d and FIG. 7e through FIG. 7g, results in movement of finger 22 in a withdrawal yielding direction 149, see comparison from FIG. 5a to FIG. 5c and from FIG. 5a to FIG. 5d. If such level of pressure continues to be applied to withdrawal contact surface 122 that finger 22 passes a release position 148, see FIG. 5c, a significantly lesser level of pressure is required to continue movement of finger 22 in withdrawal yielding direction 149, see FIG. 7g, and release of a branch 150, shown generally in FIG. 7 series, occurs without occasion for additional damage to be inflicted on branch 150. Release position 148 of finger 22 places withdrawal contact surface 122 perpendicular, or close to perpendicular, to side 112 of arm 24.

Tension Member

It is a requirement that a tension member be provided capable of exerting control over the finger of the picking finger assembly. Many types of tension member, as conventionally known in the art, may be used to provide this control. It is a requirement that the tension member provide for biasing the finger into the static position and provide for resistance to displacement of the finger in the withdrawal yielding direction. It is a strong desire that the same tension member provide for resistance to displacement of the finger in the insertion yielding direction.

Referring now to FIG. 5a through FIG. 5d, tension member 32 has opposing ends with one end attached to anchor member 34 which is secured to arm 24. The opposing end of tension member 32 is secured to transfer shaft 36 within transfer channel 38. Tension member 32 provides for resistance to displacement of transfer shaft 36 away for anchor member 34. Due to the structural arrangement of the various components, tension member 32 also provides for resistance to lateral displacement of transfer shaft 36. Tension member 32 is so configured as to provide for stationary positioning of finger 22 in static position 146 in the absence of external pressure applied to finger 22. As more fully described elsewhere herein, tension member 32 provides for various resistance to displacement of finger 22 in both insertion yielding direction 147, see FIG. 5b, and withdrawal yielding direction 149, see FIG. 5c and FIG. 5d.

Anchor Member

It is a requirement that the tension member be anchored relative to the arm. Several methods are known in the art to provide for anchoring a member relative to another member and many of these methods may be employed. In the most preferred embodiment a separate structural element is secured relative to the arm, as more fully described below. Alternatively, features may be provided on the arm to enable engagement of the tension member. One example of such an anchor member involves an aperture or slot positioned within a wall of the arm through which a portion of the tension member is positioned under pressure for retention thereat.

FIG. 5a through FIG. 5d depict anchor member 34 which penetrates opposing apertures, not shown, in arm 24 for securing thereto. A first end 152 of tension member 32 may then be secured relative to anchor member 34 to provide the desired control over other components of picking finger assembly 20.

Tension Member Displacement

It is a requirement that the end of the tension member which is attached relative to the finger be displaceable between a first placement location and a second placement location during select movement of the finger within the range of motion of the finger. This displacement provides for altering a spacing between the pivot point of the finger and the point on the finger upon which pressure is being applied by the tension member. In the most preferred embodiment this involves anchoring of the tension member to a transfer shaft which is slidably positioned within a transfer channel of the finger, as more fully described below. Alternatively, such transfer may involve slidable attachment to a shaft or post positioned on the finger or engagement of a portion or surface of the finger. One example of such engagement provides for the base portion of the finger to be partially formed of a shaft, of any desired cross sectional shape, with various bends thereon to provide for restriction of the anchoring portion of the tension member thereon. This transfer of the point on the finger upon which pressure is applied changes the torque force applied to the finger.

The transfer of the point upon which pressure is being applied results in a release position at which resistance to further displacement significantly diminishes during the displacement of the finger while being moved in the withdrawal yielding direction to release an obstruction. This release position preferably is positioned such that when the withdrawal contact surface of the finger is substantially perpendicular to the arm when such release occurs. This release position acts to further reduce any likelihood of damage to the tree by eliminating any requirement of continued significant pressure by the obstruction against the withdrawal contact surface where such continued significant pressure would require that the obstruction slide along the withdrawal contact surface. Such sliding release having the tendency to inflict damage to the obstruction. Sufficient redeployment pressure, while significantly diminished compared to the original pressure, will exist to ensure that the finger is rapidly redeployed following release of the contributing obstruction. This action will ensure that each finger enjoys a high level of opportunity to facilitate separation of fruit from the tree during the withdrawal action even following prior release of an obstruction.

FIG. 5a through FIG. 5d depict a second end 153, partially concealed, of tension member 32 attached to transfer shaft 36 as positioned within transfer channel 38. Pivot shaft 26 represents a pivotal axis about which finger 22 may pivot. While in, or near, static position 146 transfer shaft 36 has a relative spacing from pivot shaft 26, and therefore from the pivotal axis of finger 22. When finger 22 is displaced beyond release position 148 transfer shaft 36 moves within transfer channel 38 toward pivot shaft 26 which significantly reduces the torque applied to finger 22 by tension member 32.

Mechanical Harvesting Operation

The cooperation between the various parts of a specific picking finger assembly having features of the present invention, in cooperation with other displacement components, provides for a mechanical harvesting operation. This operation includes insertion of the picking finger assembly into a canopy of a tree with minimal resistance and withdrawal of the picking finger assembly from the canopy while engaging and severing fruit while releasing obstruction where not releasing the obstruction might tend to damage the tree.

Figure 5B:
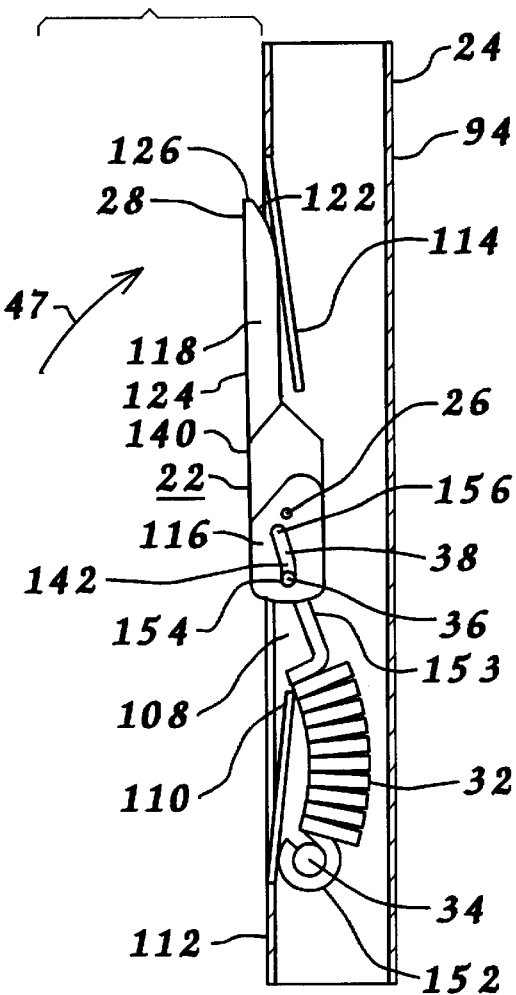
FIG. 5b is a sectional view of the assembly shown in FIG. 5a with the finger fully displaced in an insertion yielding direction.

Referring now to FIG. 5a through FIG. 5d, tension member 32 provides slight resistance pressure during displacement of finger 22 in insertion yielding direction 147, see FIG. 5b. Tension member 32 provides for return of finger 22 to static position 146 when such resistance pressure is removed. Tension member 32 provides significant resistance pressure during displacement of finger 22 in withdrawal yielding direction 149, see FIG. 5c and FIG. 5d, while transfer shaft 36 remains at a far extent 154, see FIG. 2b, FIG. 2d and FIG. 5a through FIG. 5d, within transfer channel 38 relative to pivot shaft 26, see FIG. 5a, FIG. 5b and FIG. 5c. Tension member 32 provides for return of finger 22 to static position 146 when such resistance pressure is removed. If finger 22 passes release position 148, see FIG. 5c, in withdrawal yielding direction 149 transfer shaft 36 moves within transfer channel 38 from far extent 154 to a near extent 156, see FIG. 2b, FIG. 2d and FIG. 5a through FIG. 5d generally and FIG. 5d specifically. Following such transfer of transfer shaft 36 to near extent 156 resistance to further displacement significantly reduces due to the closer orientation of transfer shaft 36 relative to pivot shaft 26, see FIG. 5d. Transfer channel 38 has angular change 142, see FIG. 2b, FIG. 2d and FIG. 5a through FIG. 5d, positioned in close proximity to far extent 154. Once transfer shaft 36 passes angular change 142, transfer shaft 36 is easily displaced to near extent 156. When transfer shaft 36 is at near extent 156 tension member 32 continues to provide for return of finger 22 to static position 146 when resistance pressure is removed. When finger 22 is returned to static position 146, transfer shaft 36 returns to far extent 154.

During insertion of the picking finger assembly into the tree the finger should be capable of displacement against the arm in response to minimal resistance of an obstruction against the insertion contact surface of the finger. This displacement action results in a minimal disturbance of the canopy, and therefore significantly reduces the likelihood of damage thereto, during the insertion action. During withdrawal of the picking finger assembly from the tree the withdrawal contact surface of the finger will be slidably engaging the canopy including the branches and stems. The finger should be capable of displacement relative to the arm to release any branches contained therein in response to reaching a predetermined threshold of pressure. This threshold of pressure will be established to be greater than that level required to facilitate separation of the fruit from the tree. This displacement action significantly reduces the likelihood of damage to the tree.

During insertion, see FIG. 7a through FIG. 7c and FIG. 8a through FIG. 8d, the predominate surface of finger 22 to make contact with objects of the tree is insertion contact surface 124. Insertion contact surface 124 provides for contact with portions of the tree during the insertion action of arm 24. These portions of the tree are exampled by stem 138, see FIG. 7 series, which may have fruit 132 attached thereto, and branch 150, see FIG. 8 series. Due to the obtuse angular intersecting orientation of insertion contact surface 124 relative to side 112 of arm 24 objects tend to be displaced away from insertion contact surface 124 in the absence of significant resistance. If such resistance is met by insertion contact surface 124 of finger 22 during insertion finger 22 may move relative to side 112 of arm 24 to allow passage of the source of the resistance, branch 150 in this case, see FIG. 7a and FIG. 7b. Referring now specifically to FIG. 8a through FIG. 8g, finger 22 is similarly retained in static position 146. When a relatively low level of pressure is applied to insertion contact surface 124 by stem 138, see FIG. 8c, movement in insertion yielding direction 147, see FIG. 5b, may occur.

During withdrawal, see FIG. 7d through FIG. 7h and FIG. 8e through FIG. 8g, the predominate surface of finger 22 to make contact with objects of the tree is withdrawal contact surface 122. Withdrawal contact surface 122 provides for contact with portions, previously described, of the tree during a withdrawal of arm 24. Due to the acute angular intersecting orientation of withdrawal contact surface 122 relative to side 112 of arm 24 objects are gathered into an intersection 158, see FIG. 5a, FIG. 7 series and FIG. 8 series, therebetween. In the case of significant resistance, as exampled by branch 150, see FIG. 7d through FIG. 7g, finger 22 may be displaced to release the object. In the case of stem 138, stem 138 will move to intersection 158 and proceed to slide along withdrawal contact surface 122 and/or upper surface 134, best shown in FIG. 2b, until clear of finger 22 or until fruit 132 attached thereto engages lower surface 128, best shown in FIG. 2d. Fruit 132 then becomes trapped by finger 22 and arm 24 during continued withdrawal of arm 24. During such withdrawal pressure increases between fruit 132 and stem 138 until fruit 132 is severed from the tree or until finger 22 is displaced and fruit 132 is released. Referring now specifically to FIG. 8e through FIG. 8g, during the retraction of arm 24 stem 138 is engaged by withdrawal contact surface 122 of finger 22. The level of resistance required to move finger 22 in withdrawal yielding direction 149, see FIG. 5c and FIG. 5d, is of a higher level of pressure than that pressure required to sever fruit 132 from stem 138, see FIG. 8f and FIG. 8g.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A picking finger assembly to provide for a harvesting of a fruit from a canopy of a fruit tree during a mechanical harvesting, the picking finger assembly comprising:

a) an arm displaceable during a deployment cycle, the deployment cycle having an insertion period and a withdrawal period, the arm insertable into the canopy of the fruit tree during the insertion period of the deployment cycle, the arm retractable from the canopy of the fruit tree during the withdrawal period of the deployment cycle, at least a portion of the withdrawal period of the deployment cycle to provide for the mechanical harvesting of the fruit from the fruit tree, the arm having a side generally vertically disposed during the mechanical harvesting;

b) a finger comprising:
   1) a base portion;
   2) an extension portion extending from the base portion, the extension portion having a withdrawal contact surface;

c) pivotal coupling means to provide for a mounting of the finger relative to the arm using the base portion of the finger wherein the finger has a pivotal movement within a range of motion relative to the arm, the extension portion of the finger extending outward relative to the side of the arm following the mounting;

d) an anchor member positioned relative to the arm;

e) a spring having a first end and a second end, the first end of the spring slidably attached relative to the finger for displacement relative to the finger between a first placement location and a second placement location during at least a portion of the pivotal movement of the finger relative to the arm, the second end of the spring attached relative to the anchor member, the spring to apply a controlling pressure to the finger while the finger is in at least a select positional orientation within the range of motion of the finger during the pivotal movement of the finger relative to the arm, wherein the spring provides for a positioning of the finger relative to the arm where the finger is positioned in a static position with the withdrawal contact surface of the extension portion of the finger remaining at an acute angle relative to the side of the arm in the absence of an external lateral pressure applied to the extension portion of the finger, the spring providing for a first range of resistance to displacement of the finger from the static position when a withdrawal contact pressure is applied to the withdrawal contact surface of the finger while the first end of the spring remains at the first placement location relative to the finger, the first end of the spring moving from the first placement location to the second placement location following a predetermined amount of an angular displacement of the extension portion of the finger relative to the arm in response to a predetermined amount of the withdrawal contact pressure applied to the withdrawal contact surface of the extension portion of the finger, the spring further provides for a second range of resistance to further displacement of the finger following the movement of the first end of the spring to the second placement location, the second range of resistance being significantly less than the first range of resistance.

2. The picking finger assembly defined in claim 1 wherein the finger further comprises:
   a) an insertion contact surface spaced from and positioned opposing the withdrawal contact surface;
   b) a guide path positioned on the extension portion of the finger and in close proximity to the arm and extending from the withdrawal contact surface to the insertion contact surface, the guide channel to receive and guide portions of the fruit tree into contact with the finger in close proximity to the side of the arm.

3. The picking finger assembly defined in claim 2 wherein the finger further comprises a cutting edge, the cutting edge defined by a sharp intersection of the guide path and the withdrawal contact surface.

4. The picking finger assembly defined in claim 2 wherein the guide path further comprises a maximum depth extending from the withdrawal contact surface to the insertion contact surface and wherein the maximum depth is generally parallel to the length of the arm while the finger is in the static position.

5. The picking finger assembly defined in claim 1 wherein the finger further comprises:
   a) an insertion contact surface spaced from and positioned opposing the withdrawal contact surface;
   b) a tapered tip positioned at the distal end of the arm wherein a spacing between the withdrawal contact surface and the insertion contact surface diminishes in close proximity to the tapered tip from a predominate spacing between the withdrawal contact surface and the insertion contact surface.

6. The picking finger assembly defined in claim 1 wherein the finger further comprises a transfer channel positioned in the base portion of the finger, the transfer channel having:
   a) a first end;
   b) a second end;
   c) a directional change between the first end and the second end;

and wherein the picking finger assembly further comprises a transfer shaft slidably positioned in the transfer channel of the finger and wherein the first end of the spring is attached relative to the transfer shaft and wherein the transfer of the first end of the spring between the first placement location and the second placement location occurs due to movement of the transfer shaft within the transfer channel.

7. The picking finger assembly defined in claim 6 wherein the finger further comprises an access channel penetrating the base of the finger and intercepting the transfer channel, the access channel to provide access to attach the first end of the spring to the transfer shaft positioned within the transfer channel.

8. The picking finger assembly defined in claim 1 wherein the range of motion of the finger relative to the arm further comprises an insertion yielding direction wherein the extension portion of the finger moves toward the arm through the acute angle between the withdrawal contact surface of the extension portion of the finger and the arm and wherein the spring further apply a controlling pressure to the finger while the finger moves in the insertion yielding direction in response to an insertion contact pressure applied to the insertion contact surface of the finger.

9. A picking finger assembly to provide for a harvesting of a fruit from a canopy of a fruit tree during a mechanical harvesting, the picking finger assembly comprising:
   a) an arm displaceable during a deployment cycle, the deployment cycle having an insertion period and a withdrawal period, the arm insertable into the canopy of the fruit tree during the insertion period of the deployment cycle, the arm retractable from the canopy of the fruit tree during the withdrawal period of the deployment cycle, at least a portion of the withdrawal period of the deployment cycle to provide for the mechanical harvesting of the fruit from the fruit tree, the arm having a side generally vertically disposed during the mechanical harvesting;
   b) a finger comprising:
      1) a base portion;

2) an extension portion extending from the base portion, the extension portion having a withdrawal contact surface;
3) a transfer channel positioned in the base portion of the finger, the transfer channel having:
i) a first end;
ii) a second end;
iii) a directional change between the first end and the second end;
c) pivotal coupling means to provide for a mounting of the finger relative to the arm using the base portion of the finger wherein the finger has a pivotal movement within a range of motion relative to the arm, the extension portion of the finger extending outward relative to the side of the arm following the mounting;
d) a transfer shaft slidably positioned in the transfer channel of the finger;
e) an anchor member positioned relative to the arm;
f) a spring having a first end and a second end, the first end of the tension member attached relative to the transfer shaft, the second end of the tension member attached relative to the anchor member, the tension member to apply a controlling pressure to the transfer shaft while the finger is in at least a select positional orientation within the range of motion of the finger during the pivotal movement of the finger relative to the arm, wherein the tension member provides for a positioning of the transfer shaft within the transfer channel relative to the arm where the finger is positioned in a static position with the withdrawal contact surface of the extension portion of the finger remaining at an acute angle relative to the side of the arm in the absence of an external lateral pressure applied to the extension portion of the finger, the transfer shaft in close proximity to the first end of the transfer channel of the finger while in the static position, the tension member providing for a first range of resistance to displacement of the finger from the static position when a withdrawal contact pressure is applied to the withdrawal contact surface of the finger while the transfer shaft remains in close proximity to the first end of the transfer channel of the finger, the transfer shaft moving past the directional change of the transfer channel following a predetermined amount of an angular displacement of the extension portion of the finger relative to the arm in response to a predetermined amount of the withdrawal contact pressure applied to the withdrawal contact surface of the extension portion of the finger, the tension member further provides for a second range of resistance to further displacement of the finger following the movement of the transfer shaft past the directional change of the transfer channel to a placement in close proximity to the second end of the transfer channel of the finger, the second range of resistance being significantly less than the first range of resistance.

10. The picking finger assembly defined in claim 9 wherein the pivotal mounting means further comprises a pivot aperture Borough the picking finger and a pivot shaft for penetration of the pivot aperture and for anchoring the arm.

11. The picking finger assembly defined in claim 9 wherein the transfer channel is disposed at an obtuse angle to create said directional change.

12. The picking finger assembly defined in claim 9 wherein the finger further comprises an access channel penetrating the base portion to the transfer channel for communication of the first end of the spring with the transfer shaft positioned in the transfer channel.

13. The picking finger assembly defined in claim 9 wherein the finger further comprises an insertion contact surface positioned opposing the withdrawal contact surface and wherein the range of motion of the finger relative to the arm further comprises an insertion yielding direction from the static position in response to an insertion contact pressure applied to the insertion contact surface of the finger.

14. The picking finger assembly defined in claim 9 wherein the tension member further comprises a coil spring.

15. A picking finger assembly to provide for a harvesting of a fruit from a canopy of a fruit tree during a mechanical harvesting, the picking finger assembly comprising:
a) an arm displaceable during a deployment cycle, the deployment cycle having an insertion period and a withdrawal period, the arm insertable into the canopy of the fruit tree during the insertion period of the deployment cycle, the arm retractable from the canopy of the fruit tree during the withdrawal period of the deployment cycle, at least a portion of the withdrawal period of the deployment cycle to provide for the mechanical harvesting of the fruit from the fruit tree, the arm having a side generally vertically disposed during the mechanical harvesting;
b) a finger comprising:
1) a base portion;
2) an extension portion extending from the base portion, the extension portion having:
i) a withdrawal contact surface;
ii) an insertion contact surface positioned opposing the withdrawal contact surface;
c) pivotal coupling means to provide for a mounting of the finger relative to the arm using the base portion of the finger wherein the finger has a pivotal movement within a range of motion relative to the arm, the extension portion of the finger extending outward relative to the side of the arm following the mounting, the range of motion having:
1) a static position wherein the withdrawal contact surface of the extension portion of the finger is at an acute angle relative to the side of the arm and wherein the insertion contact surface of the extension portion of the finger is at an obtuse angle relative to the side of the arm;
2) an insertion yielding direction wherein the extension portion of the finger moves toward the arm through the acute angle between the withdrawal contact surface of the extension portion of the finger and the arm;
3) a withdrawal yielding direction wherein the extension portion of the finger moves first away from the arm then toward the arm through the obtuse angle between the insertion contact surface of the extension portion of the finger and the arm;
d) an anchor member positioned relative to the arm;
e) a spring to provide for a control of the finger during the pivotal movement of the finger within the range of motion from the static position into the insertion yielding direction and from the static position into the withdrawal yielding direction, the spring having a first end and a second end, the first end of the spring slidably attached relative to the finger for displacement relative to the finger between a first placement location and a second placement location during at least a portion of the pivotal movement of the finger relative to the arm while moving in the withdrawal yielding direction, the second end of the spring attached relative to the anchor member, the spring to apply a controlling pressure to the finger while the finger is in at least a select positional orientation within the range of motion of the finger during the pivotal movement of the finger relative to the arm wherein the spring provides for a positioning of the finger relative to the arm where the finger is positioned in the static position with the withdrawal contact surface of the extension portion of the finger remaining at the acute angle relative to the side of the arm in the absence of an external lateral pressure applied to the extension portion of the finger, the spring providing for a first range of resistance to displacement of the finger from the static position when a withdrawal contact pressure is applied to the withdrawal contact surface of the finger while the first end of the spring remains at the first placement location relative to the finger, the first end of the spring moving from the first placement location to the second placement location following a predetermined amount of an angular displacement of the extension portion of the finger relative to the arm in response to a predetermined amount of the withdrawal contact pressure applied to the withdrawal contact surface of the extension portion of the finger, the spring further provides for a second range of resistance to further displacement of the finger following the movement of the first end of the spring to the second placement location, the second range of resistance being significantly less than the first range of resistance, the spring further applying a controlling pressure to the finger while the finger moves in the insertion yielding direction in response to an insertion contact pressure applied to the insertion contact surface of the finger.

16. The picking finger assembly defined in claim 15 wherein the finger further comprises a transfer channel positioned in the base portion of the finger, the transfer channel having:

a) a first end;

b) a second end;

c) a directional change between the first end and the second end;

and wherein the picking finger assembly further comprises a transfer shaft slidably positioned in the transfer channel of the finger and wherein the first end of the spring is attached relative to the transfer shaft and wherein the transfer of the first end of the spring between the first placement location and the second placement location occurs due to movement of the transfer shaft within the transfer channel.

17. The picking finger assembly defined in claim 15 wherein the finger further comprises an access channel penetrating the base of the finger and intercepting the transfer channel, the access channel to provide access to attach the first end of the spring to the transfer shaft positioned within the transfer channel.

18. The picking finger assembly defined in claim 15 wherein the transfer channel is disposed at an obtuse angle to create said directional change.

19. The picking finger assembly defined in claim 15 wherein the spring further comprises a coil spring.

20. The picking finger assembly defined in claim 15 wherein the arm further comprises a metallic tubing having:

a) a finger access opening for passage therethrough of the extension portion of the finger;

b) an insertion yielding direction panel anchored to the arm and extending into the arm adjacent the finger access opening to provide for a recess adjacent the finger access opening to receive a portion of the finger while the finger is fully diverted in the insertion yielding direction of the range of motion;

c) a withdrawal yielding direction panel anchored to the arm and extending into the arm adjacent the finger access opening to provide for a recess adjacent the finger access opening to receive a portion of the finger while the finger is fully diverted in the withdrawal yielding direction of the range of motion.

* * * * *